Patented Mar. 15, 1932

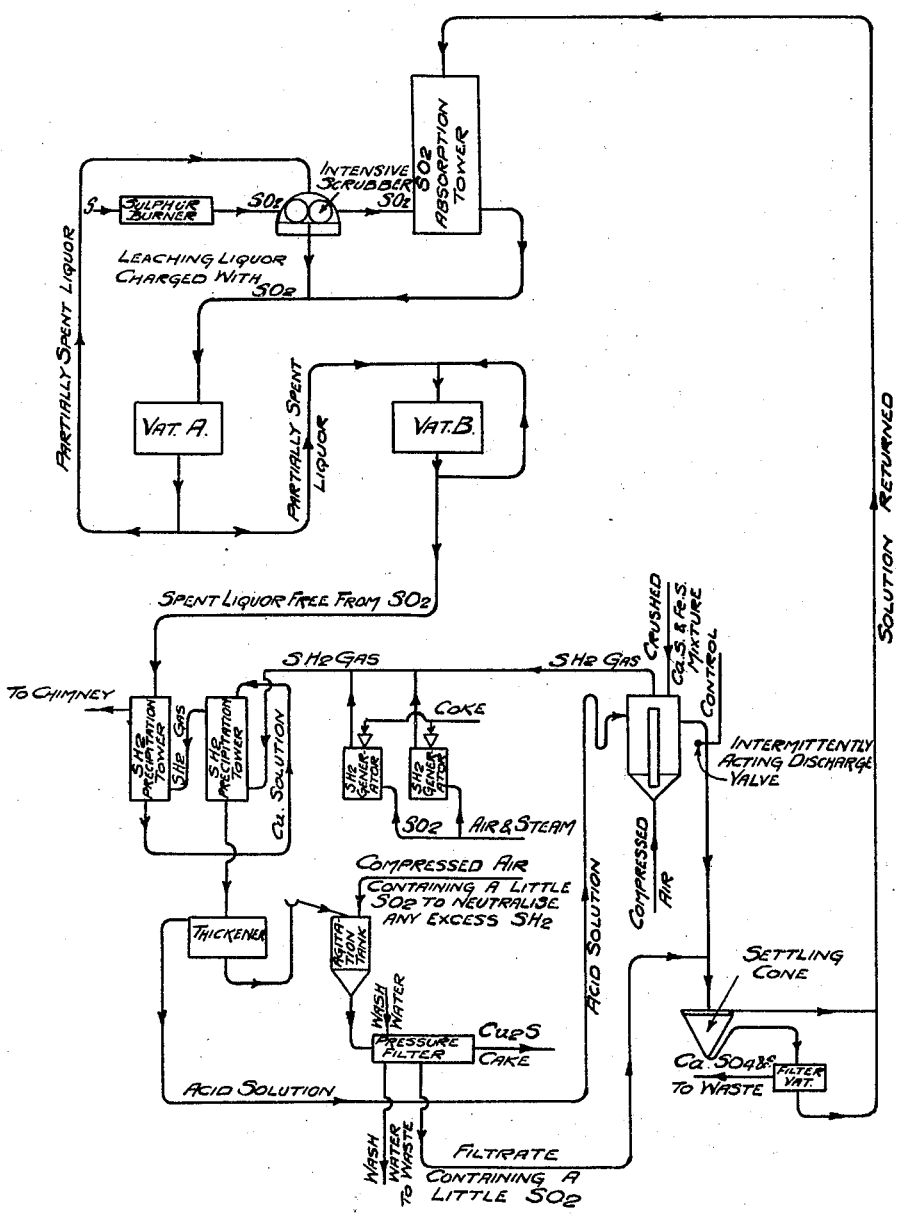

1,849,978

UNITED STATES PATENT OFFICE

FERDINAND DIETZSCH, OF KINGSTON-ON-THAMES, ENGLAND

WET EXTRACTION OF COPPER

Application filed July 19, 1928, Serial No. 294,068, and in Great Britain September 26, 1927.

It is now well known in the wet metallurgy of copper that the extraction of the metal values from oxide or oxidized copper ores by means of hydrochloric acid or sulphuric acid is far less satisfactory than that obtainable by means of a leaching liquor consisting of a somewhat concentrated solution of a metal chloride containing sulphur dioxide.

Whilst a solution of a chloride containing sulphur dioxide is an effective reagent for chloridizing copper, it is not, when of moderate concentration, a remarkable solvent for the chloridized copper, and it therefore is necessary to use either a large bulk of leaching liquor or to use a concentrated solution of the chloride. Thus solutions of sodium chloride of 20 per cent. strength and even saturated solutions have been specified. The use of concentrated solutions, however, means either a loss of material in the tailings remaining associated with the leached ore after this has been drained, or if attempt is made to recover this material by washing, a relatively expensive step is introduced into the process by the necessity for concentrating the diluted washings.

I have found that the foregoing disadvantages are avoided if the metal chloride is wholly or partly replaced by hydrogen chloride and that operation in a cyclic process is simplified, provided that the copper is precipitated from the spent leaching liquor by means of a reagent which regenerates the hydrochloric acid consumed in the extraction, namely by means of sulphuretted hydrogen.

One advantage of the invention lies in the fact that hydrochloric acid is a much better solvent for the chloridized copper, so that the chlorine ion can be considerably less than when a metal chloride alone is used. Hence the quantity of material remaining in the tailings is small and its recovery is not a difficult matter. By the process of this invention it becomes possible to treat materials rich in copper, such as rich roasted flotation concentrates, economically by the agitation method, a procedure which in the known method using solution of a metal chloride involves the difficulties already indicated owing to the moderate solvent power of the liquor for the chloridized copper.

Another important advantage of the new process is that the consumption of sulphur dioxide is lower than in the known process wherein this reagent is used in conjunction with a solution of a metal chloride. In the known process sulphuric acid formed by the reducing action of sulphur dioxide on the ore is fixed in the form of metal sulphate, which means that a certain quantity of metal chloride is consumed during each leaching operation and converted into materials of no value as far as the process is concerned. Also any acid-consuming materials in the ore are destroyed at the expense of sulphur dioxide, a part of which is therefore uselessly consumed. I have found, however, that the effect of using a liquor containing hydrochloric acid is that sulphuric acid formed by oxidation of sulphur dioxide during the leaching does not become fixed as sulphate by reaction with metal chloride when this is present together with hydrochloric acid; also that this sulphuric acid is consumed in preference to sulphur dioxide by materials such as carbonates in the ore readily attacked by acid. Exactly what reactions occur I am not prepared to say, but the net result is that acid-consuming materials are destroyed at the expense of the sulphuric acid formed by the reduction of the copper by means of sulphur dioxide, instead of by a quantity of sulphurous acid additional to that consumed in reducing the copper, as in the known process. Hence the process involves an economy in sulphur dioxide.

I have also found that the concentration of sulphur dioxide in the new process need not be so high as in the known process.

It will be understood that, as in the known process using a chloride solution together with sulphur dioxide, the presence of sulphur dioxide during the extraction is an essential condition. The treatment of copper ores with an acid chloride or other acid solution and the reduction of the dissolved copper to the cuprous state by subsequent treatment of the extract with sulphur dioxide as a preliminary to precipitation of the copper by hydrogen sulphide is known in the art, but the results attained by this treatment, in which sulphur dioxide is absent during the extraction, are far from satisfactory.

The accompanying drawing is a flow sheet of the process described herewith.

Generally the process starts with sodium chloride, or other metal chloride, to avoid importation of hydrochloric acid into the works.

When the material to be treated contains sulphur dioxide and has therefore to be roasted as a preliminary, the sulphur dioxide obtained generally suffices, not only for making up the leaching liquor but for providing the sulphuretted hydrogen, for which purpose it may be passed, together with steam, over heated carbon, such as through a gas producer.

Ferrous chloride is formed in the circulating liquor, which is no disadvantage, since it is known to be an excellent solvent of oxidized copper; it is, however, retained in the ferrous state by the sulphur dioxide, so that it does not entail precipitation of sulphur together with the cuprous sulphide.

By a modification the acid liquor obtained by precipitating the copper with sulphuretted hydrogen may be used for making sulphuretted hydrogen by reaction with ferrous sulphide or other sulphide in known manner. I have found, however, that it is advantageous to generate artificially a sulphide mixture by fusing or fritting a mixture of pyrites and lime in suitable proportions, which may be as high as 2 parts of pyrites to one part of lime. Such a mixture is readily attacked by relatively dilute acid, the sulphuretted hydrogen is used for precipitation of the next batch of copper liquor while the ferrous chloride, or other chloride, liquor is returned to the leaching vat.

In one mode of carrying out the invention the ground material is leached systematically in known manner with a saturated solution of common salt which has been saturated with sulphur dioxide while exposed to the atmosphere. The liquor from the last leaching vat of the series (in which it has spent its content of sulphur dioxide on fresh ore or has lost that content by action of heat) is run into a tank and through it is passed a current of gases containing sulphuretted hydrogen, or is allowed to sprinkle down a tower in counter-current to the gases. The precipitated cuprous sulphide is settled and the clear liquor is returned to the sulphur dioxide saturating apparatus whence it enters the leaching system again, but this time containing hydrochloric acid in place of some of the common salt. It is sometimes convenient to dispense with a separate sulphur dioxide saturator and to introduce sulphur dioxide into a mechanically agitated leaching vessel or together with air blown in for producing agitation.

The following examples illustrate the invention:—

*Example 1.*—A Chilean oxidized copper ore containing mainly carbonate and oxide of copper, together with silicate of copper, disseminated in a gangue partly soluble in acid, was crushed to ¼" size.

Two portions of the crushed product, each weighing 300 kilos and assaying 3.6 per cent. of copper, were placed on filter beds resting on false bottoms in two hard wood leaching vats A and B. The tops of these vats were covered by light sheets of tarpaulin tightly fixed to prevent the escape of gases during the leaching operations. The inner surfaces of the vats were covered with a bituminous compound having a high melting point, for protection against acid.

The leaching solution consisted of 375 litres of sodium chloride solution of 8 per cent. strength, which was charged with sulphurous acid by passing through it air containing 3 per cent. of sulphur dioxide.

The charged solution was allowed to percolate eight times in 48 hours through the ore in vat A. The flow of the solution was regulated by means of a stop-cock. The sulphurous acid content of the solution was brought up to full strength after each percolation by re-charging it with sulphur dioxide before allowing it to come again into contact with the ore. The solution was finally made to pass once through the fresh ore in vat B. In that manner the excess of sulphur dioxide was eliminated by allowing it to spend itself in dissolving copper from fresh ore.

The ore residue in vat A was next washed with a quantity of sodium chloride solution of 8 per cent. strength, free from sulphurous acid, to remove the dissolved copper values adhering to the ore which was then allowed to drain. The amount of solution still retained by the residue was then ascertained and was displaced by percolating through the ore water equivalent in quantity to the retained solution.

After this treatment the quantity of copper found in the residual ore in vat A showed that an extraction of 95.83 per cent. of the total original copper values had been obtained.

The dissolved copper in the leaching liquor and washings was precipitated by passing through the liquid a gas mixture containing hydrogen sulphide and made by passing sulphur dioxide, air and steam through glowing coke contained in an iron tube externally heated.

After the precipitation of the copper the solution was found to contain 1.2 per cent. of free acid calculated as hydrochloric acid as well as ferrous chloride and other chlorides.

This acid solution was next used to complete the treatment of the ore in vat B in exactly the same manner as described for vat A, except that the 375 litres of solution were passed through the ore eight times in 44 hours. Assay of the residual ore in vat B showed that a 96.4 per cent. extraction had been accomplished by a leach of a shorter duration than that in vat A due to the presence of the free hydrochloric acid in the leaching solution.

*Example 2.*—In the treatment of ores containing little or no gangue material soluble in acid, such as siliceous or roasted ores, the sulphuric acid produced by the reduction of cupric chloride to cuprous chloride by the action of sulphurous acid, is apt to accumulate. This acid is economically eliminated by using it to generate hydrogen sulphide from a mixture of ferrous and calcium sulphides made by melting say three parts of lime with 10 parts of pyrites.

To generate hydrogen sulphide from such a mixture of sulphides, however, requires a sulphuric acid of about 5 per cent. strength, which is a stronger concentration than is at first obtained in the leaching solution. This requisite concentration of acid can be obtained by the addition of acid from an extraneous source or can be automatically built up by at first precipitating the copper with hydrogen sulphide, this being made by passing sulphur dioxide, air and steam through glowing coke. After a few cycles of operation the sulphuric acid will have been brought to the necessary strength. Having once obtained this concentration of acid, the major part of the hydrogen sulphide can be continually generated from the sulphide mixture by the acid in the solvent solution, provided the copper in part of the solution is precipitated with hydrogen sulphide generated otherwise. This is a distinct advantage as the generation from the sulphide mixture in many localities is considerably cheaper. The whole of the hydrogen sulphide cannot be generated from the sulphide mixture as some of the acid is lost by adhering to the tailings and by dissolving gangue soluble in acid.

A Queensland copper ore consisting almost entirely of sulphides of copper and iron and which assayed 14.37 per cent. copper, was crushed to pass a ¼″ mesh sieve and was then roasted to prepare it for leaching. The gangue soluble in acid in the roasted product was small.

Hard-wood vats such as are described in Example 1 were filled each with 300 kilos of the roasted product.

The leaching solution was one that was originally sodium chloride solution of 8 per cent. strength, but owing to repeated use as solvent its sodium chloride content had been converted in part into other chlorides especially ferrous chloride. It also contained 1.65 per cent. of free hydrochloric acid and its sulphuric acid concentration had been built up to 5.28 per cent. by repeated precipitations of copper from it by hydrogen sulphide generated by passing sulphur dioxide, air and steam over glowing coke.

The solution outlet of vat A was adjusted in such a manner as to allow 1600 litres of solution to percolate eight times through the ore in 40 hours. The copper content of the residue showed that 94.5 per cent. of the copper in the ore had been extracted.

As in Example 1, the copper solution was freed from acid by passing it through the fresh ore in vat B, and its copper content precipitated with hydrogen sulphide. The precipitated sulphide of copper was allowed to settle and the supernatant liquid of acid content equivalent to 5.5 per cent. hydrochloric acid was used to attack the mixture of iron and lime sulphides in order to generate hydrogen sulphide for the precipitation of the copper from the neutral solution obtained in the treatment of another batch of ore. It was found that the acid generated was not quite sufficient for the preparation of the necessary hydrogen sulphide and to overcome this 20 per cent. of the solution was separated from the main bulk and its copper content precipitated by hydrogen sulphide generated by blowing sulphur dioxide, air and steam through red hot coke. After settling the copper sulphide and eliminating the excess of hydrogen sulphide in the solution by the addition of a sufficiency of cupriferous solution, by heating it, or by passing sulphur dioxide through it, the solution was again ready for leaching another batch of ore. Thus the process becomes cyclic.

*Example 3.*—A quantity of "flotation concentrates" was roasted in a manner which ensured good leaching extractions and was then found to assay 20.94 per cent. of copper.

Of this roasted product 300 kilos were mixed with 1125 litres of a chloride solution which had originally been a saturated solution of sodium chloride, but after repeatedly using it for leaching the same product, it had become a mixture of ferrous, sodium and other chlorides and also contained 2.8 per cent. of free acid calculated as hydrochloric acid.

The ore pulp was introduced into an agitator tank of the Pachuca type internally protected against acid corrosion and was agitated for 45 minutes by passing through it under pressure air containing 4 per cent. of sulphur dioxide. Steam was next introduced to raise the temperature of the solution to about 75° C. when practically the whole of the excess of the sulphurous acid was found to have been driven off.

After separating the cupriferous solution from the ore residues by decantation and washing them, it was found that a 96.2 per cent. extraction had been obtained.

The cupriferous solution was allowed to pass through two absorption towers in series in counter-current to an ascending current of air carrying hydrogen sulphide. The hydrogen sulphide has been prepared in a generator in which a mixture of iron and calcium sulphides was treated with an acid leaching solution produced by the precipitation of copper dissolved from a previous batch of ore. Compressed air acted as the carrier of the hydrogen sulphide and was blown through both absorption towers so as to ensure complete use of the hydrogen sulphide.

After the precipitation of the copper the acid concentration of the solution was found to be sufficiently high to be used for generating from a mixture of sulphides of iron and calcium the quantity of hydrogen sulphide required to precipitate the bulk of the copper dissolved from the next batch of ore. The remaining copper in the solution was precipitated by hydrogen sulphide generated by passing sulphur dioxide, air and steam over red-hot coke, the sulphur dioxide being obtained in roasting the "flotation concentrates". Thus the process becomes cyclic.

The use of hydrogen sulphide generated by any other known methods is not precluded.

Having thus described the nature of the said invention and the best means I know of carrying the same into practical effect, I claim:—

1. A cyclic process of winning copper values from oxide or oxidized ores, which process consist in leaching the material with a solution of hydrochloric acid and sulphur dioxide thereby dissolving the copper, precipitating cuprous sulphide from the liquor by means of sulphuretted hydrogen and thereby reforming hydrochloric acid in the liquor, separating the precipitated cuprous sulphide from the liquor, recharging the liquor with sulphur dioxide, and leaching a further quantity of ore with the recharged liquor.

2. A process as set forth in claim 1, wherein the leaching liquor containing hydrochloric acid is obtained by starting the process by leaching the material with a solution of common salt containing sulphur dioxide, and precipitating the copper with sulphuretted hydrogen.

In testimony whereof I have signed my name to this specification.

FERDINAND DIETZSCH.